United States Patent
Marine et al.

(10) Patent No.: US 6,779,744 B1
(45) Date of Patent: Aug. 24, 2004

(54) AUTOMOBILE UNDERCARRIAGE CLEANER

(76) Inventors: Efi Marine, 50 Granite St., Rockland, ME (US) 04841; Richard James LaLond, 39 Woodman Cir., Weymouth, MA (US) 02190

( * ) Notice: Subject to any disclaimer, the term of this patent is extended or adjusted under 35 U.S.C. 154(b) by 0 days.

(21) Appl. No.: 10/638,049

(22) Filed: Aug. 8, 2003

(51) Int. Cl.[7] .............................. B05B 1/14; B05B 3/00
(52) U.S. Cl. ..................... 239/536; 239/266; 239/267; 239/268; 239/289; 239/565; 239/722; 239/754
(58) Field of Search ................................. 239/266, 267, 239/268, 269, 289, 450, 536, 565, 566, 722, 754; 134/123, 172

(56) References Cited

U.S. PATENT DOCUMENTS

| | | | | |
|---|---|---|---|---|
| 2,240,611 A | * | 5/1941 | Derdeyn ..................... 239/267 |
| 2,598,961 A | * | 6/1952 | Andrus ....................... 239/450 |
| 2,689,577 A | * | 9/1954 | Dunn et al. ................. 134/123 |
| 3,321,793 A | * | 5/1967 | Braunger .................... 134/45 |
| 3,795,254 A | * | 3/1974 | Blosser ....................... 134/123 |
| 4,562,963 A | * | 1/1986 | Butler ......................... 239/266 |
| 4,580,726 A | | 4/1986 | Unger |
| 4,984,746 A | | 1/1991 | Joyal |
| 5,317,831 A | * | 6/1994 | Fletscher .................... 239/566 |
| 5,707,014 A | | 1/1998 | Chan et al. |
| D394,921 S | | 6/1998 | Cherinchak |
| 6,047,498 A | * | 4/2000 | Mann ......................... 43/132.1 |
| 6,079,640 A | | 6/2000 | Merritts |
| 6,131,831 A | | 10/2000 | Lawrence |
| 6,358,330 B1 | * | 3/2002 | McGraw ..................... 134/123 |

* cited by examiner

Primary Examiner—Robin O. Evans

(57) ABSTRACT

Vehicle undercarriage cleaners clean the undercarriage of vehicles. Dirt, mud, salt, chemicals, snow and other materials accumulate on the undersides of vehicles. The vehicle undercarriage cleaner removes these materials without requiring the user to manipulated during use by employing a set of interlocking pipes and joints laid out to form a nested rectangle. Water holes piercing the top surface of the pipes result in sprays of water when a hose is connected to the hose attachment mechanism. Addition or removal of pipes and joints allows the dimensions of the vehicle undercarriage cleaner to be adjusted to accommodate any vehicle.

6 Claims, 3 Drawing Sheets

AUTOMOBILE UNDERCARRIAGE CLEANER

BACKGROUND OF THE INVENTION

1. Field of the Invention

The present invention relates to a vehicle undercarriage cleaner for use in connection with motorized vehicles, such as automobiles and trucks, or unmotorized vehicles, such as trailers. The vehicle undercarriage cleaner has particular utility in connection with cleaning the undercarriage of vehicles.

2. Description of the Prior Art

Motorized and unmotorized vehicle undercarriage cleaners are desirable for cleaning the undercarriage of vehicles. Dirt, mud, salt, chemicals, snow, and other materials accumulate on the undersides of automobiles. These materials can cause corrosion if they are not removed, resulting in damage to the vehicle which can necessitate costly repairs. Vehicle undercarriage cleaners clean the undercarriage of vehicles and remove these materials from areas of a vehicle that cannot be reached with a conventional hose.

The use of auto underwashers is known in the prior art. For example, U.S. Pat. No. 6,079,640 to Merritts discloses an auto underwasher. However, the Merritts '640 patent does not have pipes laid out in nested rectangles, and has further drawbacks of requiring the user to manipulate it during use.

U.S. Pat. No. 4,984,746 to Joyal discloses an undercarriage sprayer for vehicles or the like that cleans the undercarriage of a vehicle. However, the Joyal '746 patent does not have pipes laid out in nested rectangles, and additionally does not clean the underside of a vehicle without requiring the user to manipulate it.

Similarly, U.S. Pat. No. Des. 394,921 to Cherinchak discloses a vehicle undercarriage washing device that cleans the underside of a vehicle. However, the Cherinchak '921 patent does not have pipes laid out in nested rectangles, and cannot clean the underside of a vehicle without requiring the user to manipulate it.

In addition, U.S. Pat. No. 6,131,831 to Lawrence discloses a portable vehicle undercarriage washer that cleans the underside of a vehicle. However, the Lawrence '831 patent does not have pipes laid out in nested rectangles, and also does not clean the underside of a vehicle without requiring the user to manipulate it.

Furthermore, U.S. Pat. No. 5,707,014 to Chan et al. discloses a water cleaning apparatus that cleans the underside of a vehicle. However, the Chan et al. '014 patent does not have pipes laid out in nested rectangles, and further lacks the ability to clean the underside of a vehicle without requiring the user to manipulate it.

Lastly, U.S. Pat. No. 4,580,726 to Unger discloses an under-car wash that spray washes the underside of a motor vehicle. However, the Unger '726 patent does not have pipes laid out in nested rectangles, and has the additional deficiency of requiring the user to manipulate it during use.

While the above-described devices fulfill their respective, particular objectives and requirements, the aforementioned patents do not describe a vehicle undercarriage cleaner that allows cleaning the undercarriage of vehicles. The above patents make no provision for pipes laid out in nested rectangles. Furthermore, the above patents require the user to manipulate the invention during use.

Therefore, a need exists for a new and improved automobile undercarriage cleaner that can be used for cleaning the undercarriage of vehicles. In this regard, the present invention substantially fulfills this need. In this respect, the vehicle undercarriage cleaner according to the present invention substantially departs from the conventional concepts and designs of the prior art, and in doing so provides an apparatus primarily developed for the purpose of cleaning the undercarriage of vehicles.

SUMMARY OF THE INVENTION

In view of the foregoing disadvantages inherent in the known types of auto underwashers now present in the prior art, the present invention provides an improved vehicle undercarriage cleaner, and overcomes the above-mentioned disadvantages and drawbacks of the prior art. As such, the general purpose of the present invention, which will be described subsequently in greater detail, is to provide a new and improved vehicle undercarriage cleaner which has all the advantages of the prior art mentioned heretofore and many novel features that result in a vehicle undercarriage cleaner which is not anticipated, rendered obvious, suggested, or even implied by the prior art, either alone or in any combination thereof.

To attain this, the present invention essentially comprises a plurality of interconnecting pipes with any water spraying device in multiple angels and a connected hose attachment mechanism.

There has thus been outlined, rather broadly, the more important features of the invention in order that the detailed description thereof that follows may be better understood and in order that the present contribution to the art may be better appreciated.

The invention may also include the pipes being laid out in interlocking rectangles, with corners formed by elbow joints. There may be T-joints inserted midway along the sides of the rectangles and connected by join pipes and hoses. For the ease of assembly or disassembly for storage quick disconnects may be installed. The hose attachment mechanism may be adapted to fit a garden hose or pressure washer. For commercial applications a fixed water supply may be adapted. The hose attachment mechanism may be attached to any outer end pipe. The ends of the elbow joints and T-joints may have washers inserted into them. The pipes may have threaded end caps encircling their opposing ends. Additional joints may be present to allow the integration of additional side pipes to increase the length of the invention. The joints may have washers inserted into their opposing ends. The pipes and joints may be made out of plastic, steel, copper, flexible plastic or fabric hose. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle undercarriage cleaner that has all of the advantages of the prior art auto underwashers and none of the disadvantages.

It is another object of the present invention to provide a new and improved vehicle undercarriage cleaner that may be easily and efficiently manufactured and marketed.

An even further object of the present invention is to provide a new and improved vehicle undercarriage cleaner that has a low cost of manufacture with regard to both materials and labor, and which accordingly is then susceptible of low prices of sale to the consuming public, thereby making such vehicle undercarriage cleaner economically available to the buying public.

Still another object of the present invention is to provide a new vehicle undercarriage cleaner that provides in the apparatuses and methods of the prior art some of the advantages thereof, while simultaneously overcoming some of the disadvantages normally associated therewith.

Even still another object of the present invention is to provide a vehicle undercarriage cleaner for cleaning the undercarriage of vehicles. This allows the user to clean the underside of a vehicle without manipulating the vehicle undercarriage cleaner during use.

Still yet another object of the present invention is to provide an automobile undercarriage cleaner for cleaning the undercarriage of vehicles. This makes it possible to adjust the dimensions of the vehicle undercarriage cleaner to accommodate any vehicle size.

An additional object of the present invention is to provide a vehicle undercarriage cleaner for cleaning the undercarriage of vehicles. This ensures the removal of dirt, mud, salt, chemicals, snow, and other materials from the underside of a vehicle so that the materials cannot cause corrosion.

A further object of the present invention is to provide a vehicle undercarriage cleaner for cleaning the undercarriage of vehicles. This reduces the overall cost of vehicle ownership by reducing the need for repairs to the undercarriage of a vehicle.

Lastly, it is an object of the present invention to provide a new and improved vehicle undercarriage cleaner for cleaning the undercarriage of vehicles.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description males reference to the annexed drawings wherein.

The same reference numerals refer to the same parts throughout the various figures.

DESCRIPTION OF THE CURRENT EMBODIMENT

Figure 1:
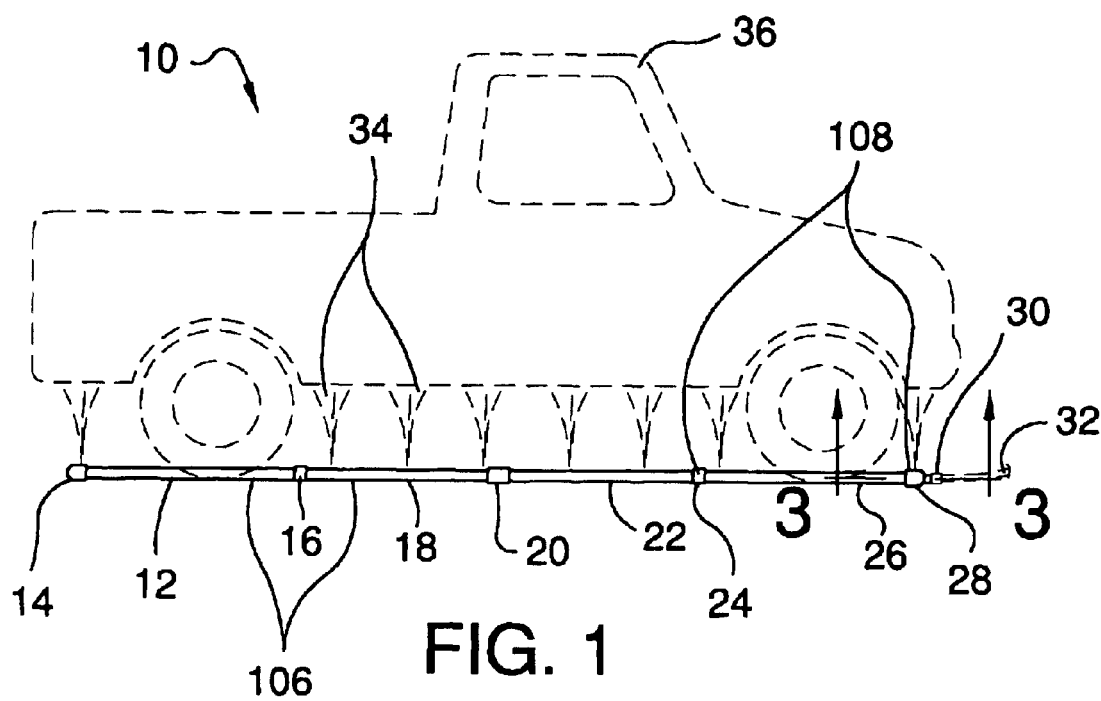
FIG. 1 is a left side view of the current embodiment of the vehicle undercarriage cleaner constructed in accordance with the principles of the present invention.

Referring now to the drawings, and particularly to FIGS. 1–4, a current embodiment of the vehicle undercarriage cleaner of the present invention is shown and generally designated by the reference numeral 10.

In FIG. 1, a new and improved vehicle undercarriage cleaner 10 of the present invention for cleaning the undercarriage of vehicles is illustrated and will be described. More particularly, the vehicle undercarriage cleaner 10 has pipes 106 and joints 108. Attached to one end of first outer side pipe 12 is first outer elbow joint 14. Attached to the opposing end of first outer side pipe 12 is fourth outer joint 16. Connected to the opposing end of fourth outer joint 16 is eighth outer side pipe 18. Connected to the opposing end of eighth outer side pipe 18 is fourth outer T-joint 20. Connected to the opposing end of fourth outer T-joint 20 is seventh outer side pipe 22. Connected to the opposing end of seventh outer side pipe 22 is third outer joint 24. Connected to the opposing end of third outer joint 24 is sixth outer side pipe 26. Connected to the opposing end of sixth outer side pipe 26 is fourth outer elbow joint 28. Hose attachment mechanism 30 is visible with attached hose 32. Hose 32 delivers water through hose attachment mechanism 30 into the vehicle undercarriage cleaner 10. Water holes (not shown) piercing the top surface of the pipes 106 allow water 34 to jet upwards, thereby cleaning the undercarriage of vehicle 36. Note that the broken lines illustrating hose 32, water 34, and vehicle 36 are for illustrative purposes only and are not part of the current invention. In the current embodiment, the pipes 106 and joints 108 are made of plastic.

Figure 2:
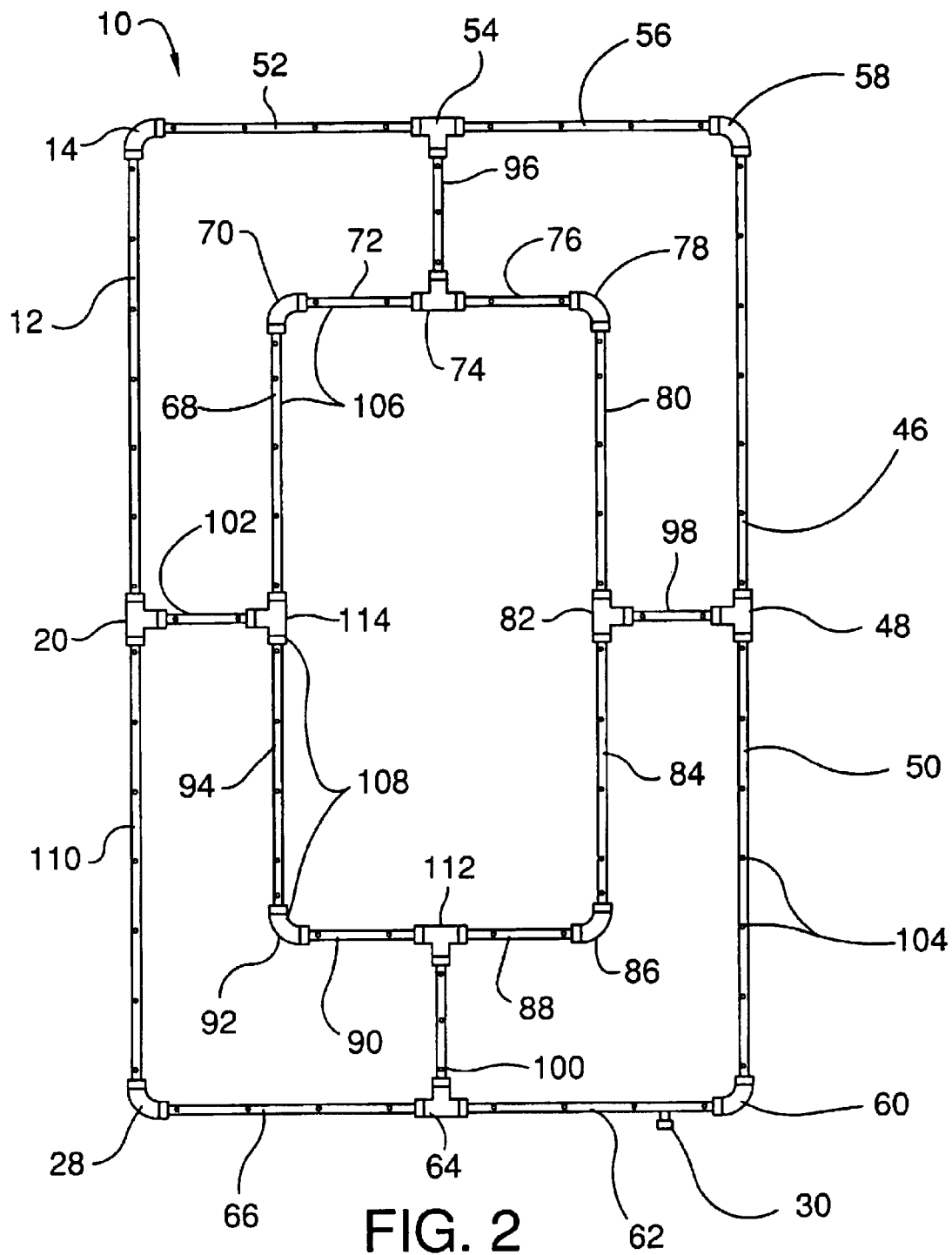
FIG. 2 is a top side view of the vehicle undercarriage cleaner of the present invention.

Moving on to FIG. 2, a new and improved vehicle undercarriage cleaner 10 of the present invention for cleaning the undercarriage of vehicles is illustrated and will be described. More particularly, the vehicle undercarriage cleaner 10 has a series of pipes 106 and joints 108 laid out in nested rectangles in the current embodiment. First outer side pipe 12 is connected to first outer elbow joint 14. The opposing end of first outer elbow joint 14 is connected to first outer end pipe 52. The opposing end of first outer end pipe 52 is connected to first outer T-joint 54. The opposing end of first outer T-joint 54 is connected to second outer end pipe 56. The opposing end of second outer end pipe 56 is connected to second outer elbow joint 58. The opposing end of second outer elbow joint 58 is connected to second outer side pipe 46. The opposing end of second outer side pipe 46 is connected to second outer T-joint 48. The opposing end of second cuter T-joint 48 is connected to third outer side pipe 50. The opposing end of third outer side pipe 50 is connected to third outer elbow joint 60. The opposing end of third outer elbow joint 60 is connected to third outer end pipe 62. The opposing end of third outer end pipe 62 is connected to third outer T-joint 64. The opposing end of third outer T-joint 64 is connected to fourth outer end pipe 66. The opposing end of fourth outer end pipe 66 is connected to fourth outer elbow joint 28. The opposing end of fourth outer elbow joint 28 is connected to fourth outer side pipe 110. The opposing end of fourth outer side pipe 110 is connected to fourth outer T-joint 20. The opposing end of fourth outer T-joint 20 is connected to the opposing end of first outer side pipe 12. First inner side pipe 68 is connected to first inner elbow joint 70. The opposing end of first inner elbow joint 70 is connected to first inner end pipe 72. The opposing end of first inner end pipe 72 is connected to first inner T-joint 74. The opposing end of first inner T-joint 74 is connected to second inner end pipe 76. The opposing end of second inner end pipe 76 is connected to second inner elbow joint 78. The opposing end of second inner elbow joint 78 is connected to second inner side pipe 80. The opposing end of second inner side pipe 80 is connected to second inner T-joint 82. The opposing end of second inner T-joint 82 is connected to third inner side pipe 84. The opposing end of third inner side pipe 84 is connected to third inner elbow joint 86. The opposing end of third inner elbow joint 86 is connected to third inner end pipe 88. The opposing end of third inner end pipe 88 is connected to third inner T-joint 112. The opposing end of third inner T-joint 112 is connected to fourth inner end pipe 90. The opposing end of fourth inner end pipe 90 is connected to fourth inner elbow joint 92. The opposing end of fourth inner elbow joint 92 is connected to fourth inner side pipe 94. The opposing end of fourth inner side pipe 94 is connected to fourth inner T-joint 114. The opposing end of fourth inner T-joint 114 is connected to the opposing end of first inner side pipe 68. The middle end of first outer T-joint 54 is connected to the middle end of first inner T-joint 74 by first join pipe 96. The middle end of second outer T-joint 48 is connected to the middle end of second inner T-joint 82 by second join pipe 98. The middle end of third outer T-joint 64 is connected to the middle end of third inner T-joint 112 by third join pipe 100. The middle end of fourth outer T-joint 20 is connected to the middle end of fourth inner T-joint 114 by fourth join pipe 102. Water holes 104 pierce the top surface of pipes 106. Hose attachment mechanism 30 is connected to the side wall of third outer end pipe 62 in the current embodiment, is made of plastic, and is adapted to fit a garden hose.

Figure 3:
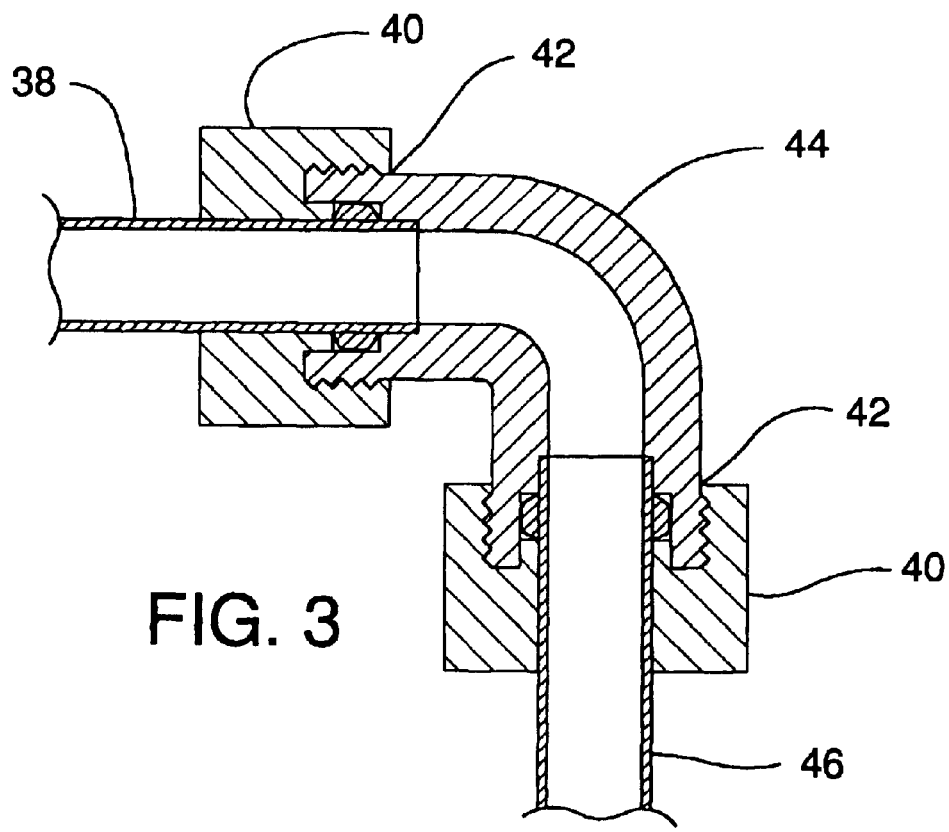
FIG. 3 is a top sectional view of the second outer elbow joint of the present invention.

In FIG. 3, a new and improved second outer elbow joint 44 of the present invention for cleaning the undercarriage of vehicles is illustrated and will be described. More particularly, the second outer elbow joint 44 has washers 42 inserted into either end. Second outer end pipe 38 is threadedly connected to one end of second outer elbow joint 44 by an end cap 40. Second outer side pipe 46 is threadedly connected to the opposing end of second outer elbow joint 44 by an end cap 40. Washers 42 ensure a watertight seal between second outer end pipe 38, second outer elbow joint 44, and second outer side pipe 46.

Figure 4:
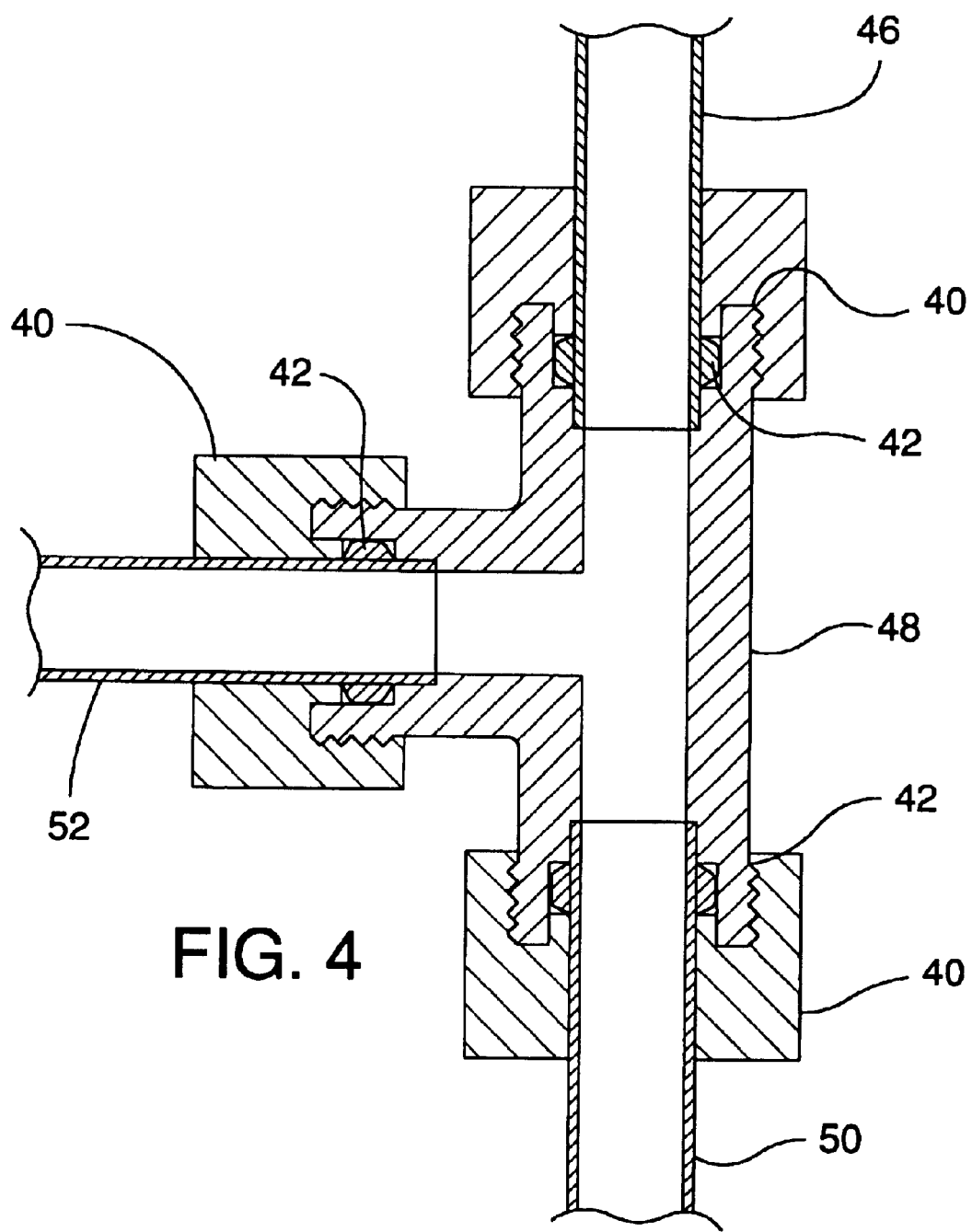
FIG. 4 is a top sectional view of the second outer T-joint of the present invention.

Concluding with FIG. 4, a new and improved second outer T-joint 48 of the present invention for cleaning the undercarriage of vehicles is illustrated and will be described. More particularly, the second outer T-joint 48 has washers 42 inserted into its opposing and middle ends. Second outer side pipe 46 is threadedly connected to one end of second outer T-joint 48 by an end cap 40. Third outer side pipe 50 is threadedly connected to the opposing end of second outer T-joint 48 by an end cap 40. Second join pipe 52 is threadedly connected to the middle end of second outer T-joint 48 by an end cap 40. Washers 42 ensure a watertight seal between second outer sidle pipe 46, third outer side pipe 50, and second join pipe 52 with second outer T-joint 48.

In use, it can now be understood that the dimensions of the vehicle undercarriage cleaner 10 can be adjusted to accommodate any vehicle by the addition or removal of pipes 106 and joints 108. Once the desired arrangement of pipes 106 and joints 108 is assembled, the automobile 36 to be cleaned is simply positioned over the vehicle undercarriage cleaner 10. Once hose 32 is connected to hose attachment mechanism 30 and a supply of water 34 is introduced into hose 32, the water 34 will spray upwards through water holes 104, thereby cleaning the undercarriage of vehicle 36.

While a current embodiment of the vehicle undercarriage cleaner has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as steel or copper may be used instead of the plastic pipes and joints described. Also, the hose attachment mechanism malt also be made of steel or copper and may be adapted to fit a pressure washer as well as a garden hose. And although cleaning the undercarriage of vehicles has been described, it should be appreciated that the vehicle undercarriage cleaner herein described is also suitable for watering plants. Furthermore, a wide variety of hose attachment mechanism placements may be used instead of the attachment to the side wall of the third outer end pipe described.

Therefore the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An vehicle undercarriage cleaner comprising:

a first outer side pipe having opposing ends and a top surface;

a first outer elbow joint having opposing ends with one end connected to said end of said first outer side pipe;

a first outer end pipe having opposing ends and a top surface with one end connected to said opposing end of said first outer elbow joint;

a first outer T-joint having opposing ends and a middle end with one end connected to said opposing end of said first outer end pipe;

a second outer end pipe having opposing ends and a top surface with one end connected to said opposing end of said first outer T-joint;

a second outer elbow joint having opposing ends with one end connected to said opposing end of said second outer end pipe;

a second outer side pipe having opposing ends and a top surface with one end connected to said opposing end of said second outer elbow joint;

a second outer T-joint having opposing ends and a middle end with one end connected to said opposing end of said second outer side pipe;

a third outer side pipe having opposing ends and a top surface with one end connected to said opposing end of said second outer T-joint;

a third outer elbow joint having opposing ends with one end connected to said opposing end of said third outer side pipe;

a third outer end pipe having opposing ends, a sidewall, and a top surface with one end connected to said opposing end of said third outer elbow joint;

a third outer T-joint having opposing ends and a middle end with one end connected to said opposing end of said third outer end pipe;

a fourth outer end pipe having opposing ends and a top surface with one end connected to said opposing end of said third outer T-joint;

a fourth outer elbow joint having opposing ends with one end connected to said opposing end of said fourth outer end pipe;

a fourth outer side pipe having opposing ends and a top surface with one end connected to said opposing end of said fourth outer elbow joint;

a fourth outer T-joint having opposing ends and a middle end with one end connected to said opposing end of said fourth outer side pipe and said opposing end connected to said opposing end of said first outer side pipe;

water holes, wherein said top surface of said first outer side pipe, first outer end pipe, second outer end pipe, second outer side pipe, third outer side pipe, third outer end pipe, fourth outer end pipe, and fourth outer side pipe comprises holes therein to comprise said water holes; and a hose attachment mechanism connected to said sidewall of said third outer end pipe.

2. The vehicle undercarriage cleaner as defined in claim 1, further comprising:

a first inner side pipe having opposing ends and a top surface;

a first inner elbow joint having opposing ends with one end connected to said end of said first inner side pipe;

a first inner end pipe having opposing ends and a top surface with one end connected to said opposing end of said first inner elbow joint;

a first inner T-joint having opposing ends and a middle end with one end connected to said opposing end of said first inner end pipe;

a second inner end pipe having opposing ends and a top surface with one end connected to said opposing end of said first inner T-joint;

a second inner elbow joint having opposing ends with one end connected to said opposing end of said second inner end pipe;

a second inner side pipe having opposing ends and a top surface with one end connected to said opposing end of said second inner elbow joint;

a second inner T-joint having opposing ends and a middle end with one end connected to said opposing end of said second inner side pipe;

a third inner side pipe having opposing ends and a top surface with one end connected to said opposing end of said second inner T-joint;

a third inner elbow joint having opposing ends with one end connected to said opposing end of said third inner side pipe;

a third inner end pipe having opposing ends, a sidewall, and a top surface with one end connected to said opposing end of said third inner elbow joint;

a third inner T-joint having opposing ends and a middle end with one end connected to said opposing end of said third inner end pipe;

a fourth inner end pipe having opposing ends and a top surface with one end connected to said opposing end of said third inner T-joint;

a fourth inner elbow joint having opposing ends with one end connected to said opposing end of said fourth inner end pipe;

a fourth inner side pipe having opposing ends and a top surface with one end connected to said opposing end of said fourth inner elbow joint;

a fourth inner T-joint having opposing ends and a middle end with one end connected to said opposing end of said fourth inner side pipe and said opposing end connected to said opposing end of said first inner side pipe;

a first join pipe having opposing ends with one end connected to said middle end of said first outer T-joint and said opposing end connected to said middle end of said first inner T-joint;

a second join pipe having opposing ends with one end connected to said middle end of said second outer T-joint and said opposing end connected to said middle end of said second inner T-joint;

a third join pipe having opposing ends with one end connected to said middle end of said third outer T-joint and said opposing end connected to said middle end of said third inner T-joint;

a fourth join pipe having opposing ends with one end connected to said middle end of said fourth outer T-joint and said opposing end connected to said middle end of said fourth inner T-joint; and water holes, wherein said top surface of said first join pipe, second join pipe, third join pipe, fourth join pipe, first inner side pipe, first inner end pipe, second inner end pipe, second inner side pipe, third inner side pipe, third inner end pipe, fourth inner end pipe, and fourth inner side pipe comprises holes therein to comprise said water holes.

3. A vehicle undercarriage cleaner comprising:

a first outer side pipe having opposing ends and a top surface;

a first outer elbow joint having opposing ends with one end connected to said end of said first outer side pipe;

a first outer end pipe having opposing ends and a top surface with one end connected to said opposing end of said first outer elbow joint;

a first outer T-joint having opposing ends and a middle end with one end connected to said opposing end of said first outer end pipe;

a second outer end pipe having opposing ends and a top surface with one end connected to said opposing end of said first outer T-joint;

a second outer elbow joint having opposing ends with one end connected to said opposing end of said second outer end pipe;

a second outer side pipe having opposing ends and a top surface with one end connected to said opposing end of said second outer elbow joint;

a first outer joint having opposing ends with one end connected to said opposing end of said second outer side pipe;

a third outer side pipe having opposing ends and a top surface with one end connected to said opposing end of said first outer joint;

a second outer T-joint having opposing ends and a middle end with one end connected to said opposing end of said third outer side pipe;

a fourth outer side pipe having opposing ends, a sidewall, and a top surface with one end connected to said opposing end of said second outer T-joint;

a second outer joint having opposing ends with one end connected to said opposing end of said fourth outer side pipe;

a fifth outer side pipe having opposing ends, a sidewall, and a top surface with one end connected to said opposing end of said second outer joint;

a third outer elbow joint having opposing ends with one end connected to said opposing end of said fifth outer side pipe;

a third outer end pipe having opposing ends, a sidewall, and a top surface with one end connected to said opposing end of said third outer elbow joint;

a third outer T-joint having opposing ends and a middle end with one end connected to said opposing end of said sixth outer end pipe;

a fourth outer end pipe having opposing ends and a top surface with one end connected to said opposing end of said third outer T-joint;

a fourth outer elbow joint having opposing ends with one end connected to said opposing end of said fourth outer end pipe;

a sixth outer side pipe having opposing ends and a top surface with one end connected to said opposing end of said fourth outer elbow joint;

a third outer joint having opposing ends with one end connected to said opposing end of said sixth outer side pipe;

a seventh outer side pipe having opposing ends and a top surface with one end connected to said opposing end of said third outer joint;

a fourth outer T-joint having opposing ends and a middle end with one end connected to said opposing end of said seventh outer side pipe;

an eighth outer side pipe having opposing ends and a top surface with one end connected to said opposing end of said fourth outer T-joint;

a fourth outer joint having opposing ends with one end connected to said opposing end of said eighth outer side pipe and said opposing end connected to said opposing end of said first outer side pipe;

water holes, wherein said top surface of said first outer side pipe, first outer end pipe, second outer end pipe, second outer side pipe, third outer side pipe, fourth outer side pipe, fifth outer side pipe, third outer end pipe, fourth outer end pipe, sixth outer side pipe, seventh outer side pipe, and eighth outer side pipe comprises holes therein to comprise said water holes; and a hose attachment mechanism connected to said sidewall of said third outer end pipe.

4. The vehicle undercarriage cleaner as defined in claim 3, further comprising:

a first inner side pipe having opposing ends and a top surface;

a first inner elbow joint having opposing ends with one end connected to said end of said first inner side pipe;

a first inner end pipe having opposing ends and a top surface with one end connected to said opposing end of said first inner elbow joint;

a first inner T-joint having opposing ends and a middle end with one end connected to said opposing end of said first inner end pipe;

a second inner end pipe having opposing ends and a top surface with one end connected to said opposing end of said first inner T-joint;

a second inner elbow joint having opposing ends with one end connected to said opposing end of said second inner end pipe;

a second inner side pipe having opposing ends and a top surface with one end connected to said opposing end of said second inner elbow joint;

a first inner joint having opposing ends with one end connected to said opposing end of said second inner side pipe;

a third inner side pipe having opposing ends and a top surface with one end connected to said opposing end of said first inner joint;

a second inner T-joint having opposing ends and a middle end with one end connected to said opposing end of said third inner side pipe;

a fourth inner side pipe having opposing ends, a sidewall, and a top surface with one end connected to said opposing end of said second inner T-joint;

a second inner joint having opposing ends with one end connected to said opposing end of said fourth inner side pipe;

a fifth inner side pipe having opposing ends, a sidewall, and a top surface with one end connected to said opposing end of said second inner joint;

a third inner elbow joint having opposing ends with one end connected to said opposing end of said fifth inner side pipe;

a third inner end pipe having opposing ends, a sidewall, and a top surface with one end connected to said opposing end of said third inner elbow joint;

a third inner T-joint having opposing ends and a middle end with one end connected to said opposing end of said sixth inner end pipe;

a fourth inner end pipe having opposing ends and a top surface with one end connected to said opposing end of said third inner T-joint;

a fourth inner elbow joint having opposing ends with one end connected to said opposing end of said fourth inner end pipe;

a sixth inner side pipe having opposing ends and a top surface with one end connected to said opposing end of said fourth inner elbow joint;

a third inner joint having opposing ends with one end connected to said opposing end of said sixth inner side pipe;

a seventh inner side pipe having opposing ends and a top surface with one end connected to said opposing end of said third inner joint;

a fourth inner T-joint having opposing ends and a middle end with one end connected to said opposing end of said seventh inner side pipe;

an eighth inner side pipe having opposing ends and a top surface with one end connected to said opposing end of said fourth inner T-joint;

a fourth inner joint having opposing ends with one end connected to said opposing end of said eighth inner side pipe and said opposing end connected to said opposing end of said first inner side pipe;

a first join pipe having opposing ends with one end connected to said middle end of said first outer T-joint and said opposing end connected to said middle end of said first inner T-joint;

a second join pipe having opposing ends with one end connected to said middle end of said second outer T-joint and said opposing end connected to said middle end of said second inner T-joint;

a third join pipe having opposing ends with one end connected to said middle end of said third outer T-joint and said opposing end connected to said middle end of said third inner T-joint;

a fourth join pipe having opposing ends with one end connected to said middle end of said fourth outer T-joint and said opposing end connected to said middle end of said fourth inner T-joint; and water holes, wherein said top surface of said first join pipe, second join pipe, third join pipe, fourth join pipe, first inner side pipe, first inner end pipe, second inner end pipe, second inner side pipe, third inner side pipe, fourth inner side pipe, fifth inner side pipe, third inner end pipe, fourth inner end pipe, sixth inner side pipe, seventh inner side pipe, and eighth inner side pipe comprises holes therein to comprise said water holes.

5. The vehicle undercarriage cleaner of claim 3, wherein said first outer joint, second outer joint, third outer joint, and fourth outer joint further comprise washers inserted into said opposing ends of said first outer joint, second outer joint, third outer joint, and fourth outer joint.

6. The vehicle undercarriage cleaner of claim of claim 4, wherein said first inner joint, second inner joint, third inner joint, and fourth inner joint further comprise washers inserted into said opposing ends of said first inner joint, second inner joint, third inner joint, and fourth inner joint.

* * * * *